(12) United States Patent
Feth (10) Patent No.: US 8,373,863 B2
(45) Date of Patent: Feb. 12, 2013

(54) STITCHED WAVEGUIDE FOR USE IN A FIBER-OPTIC GYROSCOPE

(75) Inventor: John Feth, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 547 days.

(21) Appl. No.: 12/695,291

(22) Filed: Jan. 28, 2010

(65) Prior Publication Data
US 2010/0135610 A1  Jun. 3, 2010

Related U.S. Application Data

(63) Continuation-in-part of application No. 12/040,866, filed on Feb. 29, 2008, now abandoned.

(51) Int. Cl.
*G01C 19/72* (2006.01)
(52) U.S. Cl. ........................................ 356/460
(58) Field of Classification Search .................. 356/477, 356/483, 460; 385/14
See application file for complete search history.

(56) References Cited

U.S. PATENT DOCUMENTS

| | | | |
|---|---|---|---|
| 4,848,910 A | 7/1989 | Dupraz | |
| 5,875,276 A | 2/1999 | Mahapatra et al. | |
| 5,982,964 A | 11/1999 | Marx et al. | |
| 6,990,269 B2 * | 1/2006 | Ohno et al. | ............ 385/27 |
| 2004/0091207 A1 | 5/2004 | Ohno et al. | |
| 2006/0056002 A1 * | 3/2006 | Wooten et al. | ............ 359/245 |

OTHER PUBLICATIONS

European Patent Office, "European Search Report", Jan. 14, 2009, Published in: EP.

* cited by examiner

*Primary Examiner* — Tarifur Chowdhury
*Assistant Examiner* — Jonathan Hansen
(74) *Attorney, Agent, or Firm* — Fogg & Powers LLC (57) ABSTRACT

Methods and systems for improved fiber optic gyroscopes for operation in non-atmospheric environments are provided. In one embodiment, an integrated optical circuit for an interferometer subject to non-atmospheric conditions comprises: a first section of waveguide within a Lithium crystalline structure that is exposed to an electrical field, the first section of waveguide being a Titanium-diffused waveguide region; a second section of waveguide within the Lithium crystalline structure that is not within the first section of the waveguide, the second section of waveguide being a proton-exchange waveguide region; a stitch coupling the first section of waveguide to the second section of waveguide; and a third section of waveguide configured to combine reciprocal light beams to produce an interference pattern, wherein at least one of the reciprocal light beams pass through the first section of waveguide and the second section of waveguide prior to producing the interference pattern.

17 Claims, 9 Drawing Sheets

STITCHED WAVEGUIDE FOR USE IN A FIBER-OPTIC GYROSCOPE

CROSS-REFERENCE TO RELATED APPLICATIONS

This Application is a continuation-in-part of, and claims priority to, U.S. application Ser. No. 12/040,866 entitled "STITCHED WAVEGUIDE FOR USE IN A FIBER-OPTIC GYROSCOPE" filed on Feb. 29, 2008, which is herein incorporated by reference.

BACKGROUND

A fiber optic gyroscope (FOG) uses the interference of light to measure angular velocity. Rotation is sensed in a fiber optic gyroscope using a large coil of optical fiber. To measure angular velocity, two phase modulated light beams are introduced into a coil in opposite directions by an electro-optic modulating device such as an integrated optical circuit (IOC). When the coil is undergoing rotation, a light beam traveling in the direction of rotation will experience a longer path to the other end of the fiber loop than the light beam traveling against the rotation. This is known as the Sagnac effect. As the beams exit the fiber they are combined. The phase shift between the counter-rotating light beams due to the Sagnac effect is a function of the rotational rate of the coil. Thus by evaluating the intensity and phase of the interference of the resulting combined beam, the angular velocity of the coil can be determined.

One material typically used in IOC waveguides for fiber optic gyroscopes is $LiNbO_3$. Lithium niobate does not exist in nature. It is synthesized to create its piezoelectric properties. Modulation of the counter propagating light beams is accomplished by applying a voltage across a portion of the waveguide, which in turn changes the refractive index of the $LiNbO_3$ material. This effect enables phase modulation, $\phi(t)$, of the electromagnetic light wave transiting the waveguide. However, a problem has been observed in these fiber optic gyroscopes when operating in non-atmospheric conditions such as a vacuum or near vacuum environment, such as outer space. A phenomenon referred to herein as "ionic migration" occurs in proton exchanged $LiNbO_3$ waveguides operating under non-atmospheric conditions that are exposed to electric fields. This observed "ionic migration" corrupts the electro-optic modulation of light beams, eventually rendering the fiber optic gyroscope inoperable.

For the reasons stated above and for other reasons stated below which will become apparent to those skilled in the art upon reading and understanding the specification, there is a need in the art for improved fiber optic gyroscopes for operation in non-atmospheric environments.

SUMMARY

The Embodiments of the present invention provide methods and systems for improved fiber optic gyroscopes for operation in non-atmospheric environments and will be understood by reading and studying the following specification.

In one embodiment, an integrated optical circuit for an interferometer subject to non-atmospheric conditions comprises: a first section of waveguide within a Lithium crystalline structure that is exposed to an electrical field, the first section of waveguide being a Titanium-diffused waveguide region; a second section of waveguide within the Lithium crystalline structure that is not within the first section of the waveguide, the second section of waveguide being a proton-exchange waveguide region; a stitch coupling the first section of waveguide to the second section of waveguide; and a third section of waveguide configured to combine reciprocal light beams to produce an interference pattern, wherein at least one of the reciprocal light beams passes through the first section of waveguide and the second section of waveguide prior to producing the interference pattern.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

An interferometer is a device that analyzes interference that occurs between two light beams travelling on reciprocal paths. A fiber optic gyroscope is one particular type of reciprocal interferometer that utilizes interference between the beams and derives rotational rate information from it. A light beam is split and phase modulated so that opposing light beams travel in opposite directions around a loop of optical fiber. The modulated light beams are travelling along the same path, but one is travelling in the clockwise direction while the other is travelling in the counterclockwise direction. These counter-propagating light beams produce a time varying interference pattern referred to here as an interferogram. Disturbances in the interferogram are measured to determine a rate of rotation about the axis of the fiber optic gyroscope.

Using proton exchanged LiNbO$_3$ waveguides in fiber optic gyroscopes is very beneficial because these waveguides have the attribute of providing a high degree of linear polarization. That is, passing light through the proton exchanged LiNbO$_3$ waveguide will filter out substantially all but a single linear polarization of light, substantially eliminating errors in rotational rate determination due to interactions between waves of different polarization. Polarization provided by proton exchanged LiNbO$_3$ greatly increases the precision of the fiber optic gyro rate measurement to the level necessary for the most demanding navigation requirements. Having interactions between waves of different polarization within the gyroscope is problematic because it introduces changes to the interferogram that do not necessarily reflect changes to angular velocity.

When operating under non-atmospheric conditions however, proton exchanged LiNbO$_3$ waveguides are susceptible to the "ionic migration" phenomenon that corrupts the electro-optic modulation of the light beams. Such corruption is also problematic because it also introduces changes to the interferogram that do not necessarily reflect changes to angular velocity. As used herein, the term "non-atmospheric conditions" refers to operating conditions where the composition of the atmosphere deviates from the Earth's standard atmospheric composition and/or partial pressures. That is, a non-atmospheric condition is exclusive of air alone. For example, operating in vacuum or near vacuum environments, such as outer space would be operating in non-atmospheric conditions. Operating in an environment filled with a dry noble gas such as krypton is another example of non-atmospheric conditions.

Although this description primarily discusses LiNbO$_3$, one of ordinary skill in the art upon studying this specification would appreciate that embodiments of the present invention also apply to LiTaO$_3$ waveguides. Both are Lithium crystalline structures. Niobium and Tantalum are juxtaposed in the same group (a group is a column on the periodic chart), and, as expected, form similar chemical compounds. The electro-optic similarities of LiNbO$_3$ and LiTaO$_3$ allow construction of similar optical circuits as both substances allow waveguide formation by diffusion of protons (H$^+$) and Ti$^+$ to replace the Li$^+$ in the respective crystals. The values for properties listed in Table 1, below, are typical of those found in literature. Some variability of these values is typical with man-made materials. The actual values for these parameters are not important for purposes of this patent.

TABLE 1

| Property | LiNbO$_3$ | LiTaO$_3$ |
| --- | --- | --- |
| Crystal Symmetry | Trigonal, 3 m | Trigonal, 3 m |
| Lattice constant, Å | a = 5.148 c = 13.863 | a = 5.154 c = 13.783 |
| Refractive Indices at 633 nm | n$_o$ = 2.286 n$_e$ = 2.202 negative uniaxial | n$_o$ = 2.175 n$_e$ = 2.180 positive uniaxial |
| Electro-optic Coefficients, pm/V at 633 nm | r$_{33}$ = 31<br>r$_{31}$ = 9<br>r$_{22}$ = 3.4 | r$_{33}$ = 33<br>r$_{31}$ = 8<br>r$_{22}$ = 20 |

LiNbO$_3$ and LiTaO$_3$ are both piezo-electric, i.e., the positive and negative electrical charges in the respective molecules are separated, but symmetrically distributed, so that both crystals overall are electrically neutral; however each molecule has a dipole. In microscopic regions the dipoles of adjacent molecules are aligned, but in macroscopic regions, the dipoles of the microscopic regions are randomly oriented. To exploit the electro-optic properties of these crystals, they are heated and exposed to a strong electric field (a process called poling) which aligns all of the dipoles in the entire crystal.

Figure 1A:
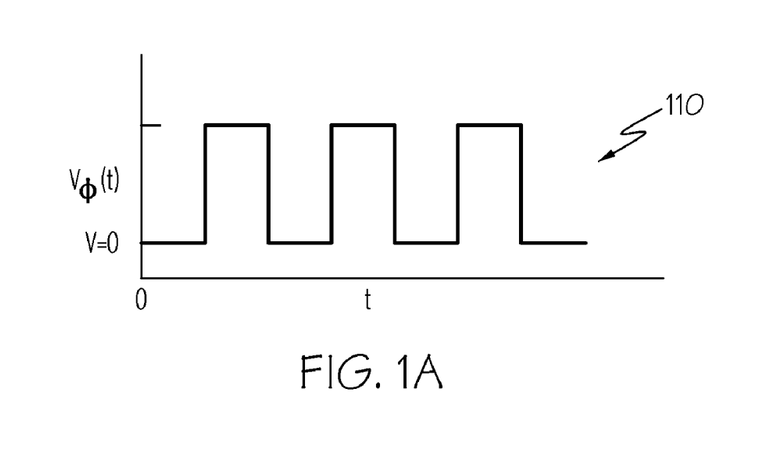
FIGS. 1A and 1B illustrate the ionic migration effect of corrupted modulation in an interferometer under non-atmospheric conditions.
Figure 1B:
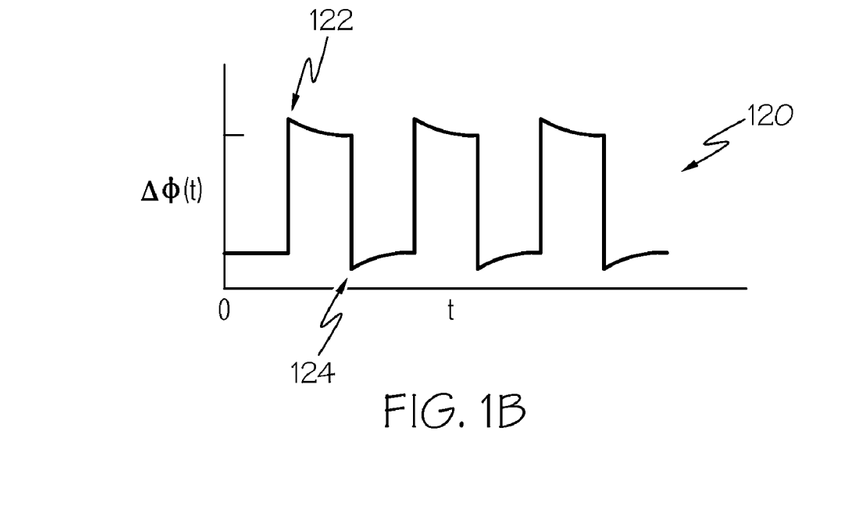

FIGS. 1A and 1B are representative illustrations of the effects of "ionic migration" on electro-optic modulation of light beams. In different applications, corruption can create waveforms different from those shown. In a LiNbO$_3$ waveguide, when a voltage is applied across electrodes parallel to the waveguide, a piezo-electric effect changes spacing between the atoms in the poled molecules of LiNbO$_3$, which in turn changes the refractive index of the LiNbO$_3$ material. This effect enables phase modulation of the light beam. Normally, when an electric field is applied across a LiNbO$_3$ waveguide the response of the material's refractive index follows the voltage of the electric field very accurately. However, after soaking in a non-atmospheric condition such as a vacuum, "ionic migration" manifests itself and corrupts the response as shown in FIG. 1. FIG. 1 at 110 generally illustrates application of the voltage V$\phi$(t), where t is time, across the electrodes. Instead of a phase response $\Delta\phi$(t) that follows the applied voltage V$\phi$(t) (as would be the response in a standard atmospheric environment such as air, for example) the phase response $\Delta\phi$(t) is corrupted, as shown generally at 120, where it overshoots the desired $\Delta\phi$ at both the upward response (shown at 122) and the downward response (shown at 124). As mentioned above, these waveforms shown are provided to illustrate one representation of corruption caused by ionic migration. Other manifestations of corruption cause by ionic migration are possible and would also be avoided using embodiments of the present invention.

In non-interferometric optical applications, such as fiber optic communication, such distortion is not a concern because such systems are interested only in discerning a logical high value (ie, a "1") from a logical low value (ie, a "0") from the light beam based on a predetermined magnitude threshold. As long a logical high can be discerned from a logical low, data placed onto the optical transport can be retrieved. For an interferometer however, the object is not to retrieve data placed onto an optical transport. Such non-linear and time-variant distortion in phase modulation shown in FIG. 1 will affect how the counter-propagating beams will interfere with each other. This distortion will introduce changes to the interferogram that do not reflect changes to angular velocity and thus will introduce error.

Embodiments of the present invention address the ionic migration phenomenon for fiber optic gyroscopes by identifying those portions of LiNbO$_3$ waveguides within the gyroscope that would be susceptible to ionic migration under non-atmospheric conditions if proton-exchange waveguide material were used, and instead use Titanium-diffused waveguide material for those sections. As discussed above, this determination is made by identifying those portions of LiNbO$_3$ waveguides that are exposed to electrical fields. Although modulator electrodes within the fiber optic gyroscope are a prevalent source of such fields, embodiments of the present invention are not so limited. Embodiments of the present invention may be applied anywhere where distortion due to ionic migration needs to be suppressed or avoided.

As discussed above, a high degree of polarization is a benefit of using proton-exchanged waveguides. Titanium-diffused waveguides, in contrast, do not polarize light. For this reason, a fiber optic gyroscope constructed entirely from Titanium-diffused waveguides would suffer from performance degradations caused by interference between dissimilarly polarized light beams. Embodiments of the present invention provide interferometers that utilize proton-exchanged LiNbO$_3$ waveguides for areas not exposed to electric fields (because ionic migration will not occur in those areas) and Titanium-diffused LiNbO$_3$ waveguides for areas that need to be protected from ionic migration. Such a configuration provides both good polarization and stable modulation of the light beams, both of which contribute to providing accurate rotational data.

Figure 2:
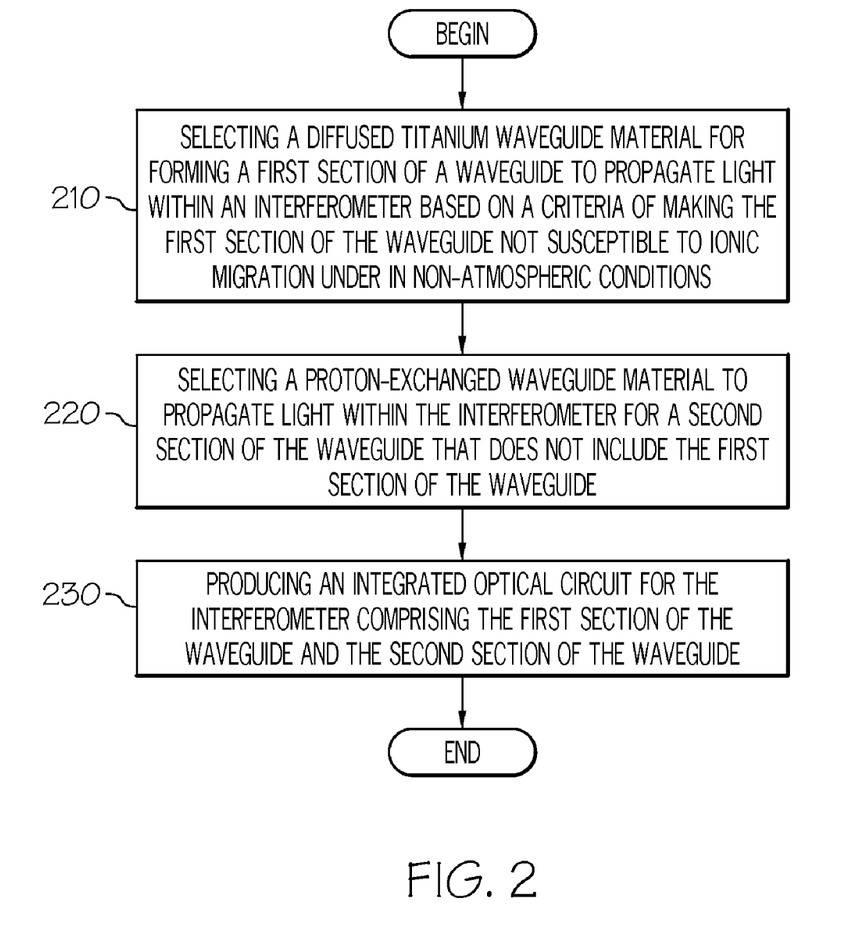
FIG. 2 is a flow chart illustrating a process for mitigating ionic migration in a fiber-optic gyroscope.

FIG. 2 is a flow chart illustrating a method for mitigating ionic migration in a waveguide of one embodiment of the present invention. As explained above, ionic migration in interferometer based optical gyroscopes corrupts the modulation of the counter-propagating light beams that eventually renders the gyroscope inoperable. Such ionic migration occurs when the interferometer operates in an environment with non-atmospheric conditions. As would be appreciated by one of ordinary skill in the art reading this specification, the term "vacuum" is a relative term that does not necessarily require an absolute vacuum. For example, the vacuum of outer space is not absolute. One of ordinary skill in the art upon reading this specification would possess sufficient information to know whether a particular application of an interferometer was operating in what would be recognized as an environment with non-atmospheric conditions.

The method begins at 210 with selecting a diffused titanium waveguide material for forming a first section of a waveguide to propagate light based on making the first section of the waveguide not susceptible to ionic migration under in non-atmospheric conditions. Selecting diffused titanium waveguide material for sections of the waveguide exposed to electric field will suppress or avoid the ionic migration phenomenon for those sections. The method proceeds to 220 with selecting a proton-exchanged waveguide material to propagate light for a second section of the waveguide that does not include the first section of the waveguide. Proton-exchanged waveguide material has the desirable property of providing a high degree of polarization for light, which is highly beneficial for interferometric applications. The method proceeds to 230 with producing an integrated optical circuit for an interferometer comprising the first section of the waveguide and the second section of the waveguide. In one embodiment, a stitching process is applied to couple the first section of the waveguide to the second section of the waveguide.

Figure 3:
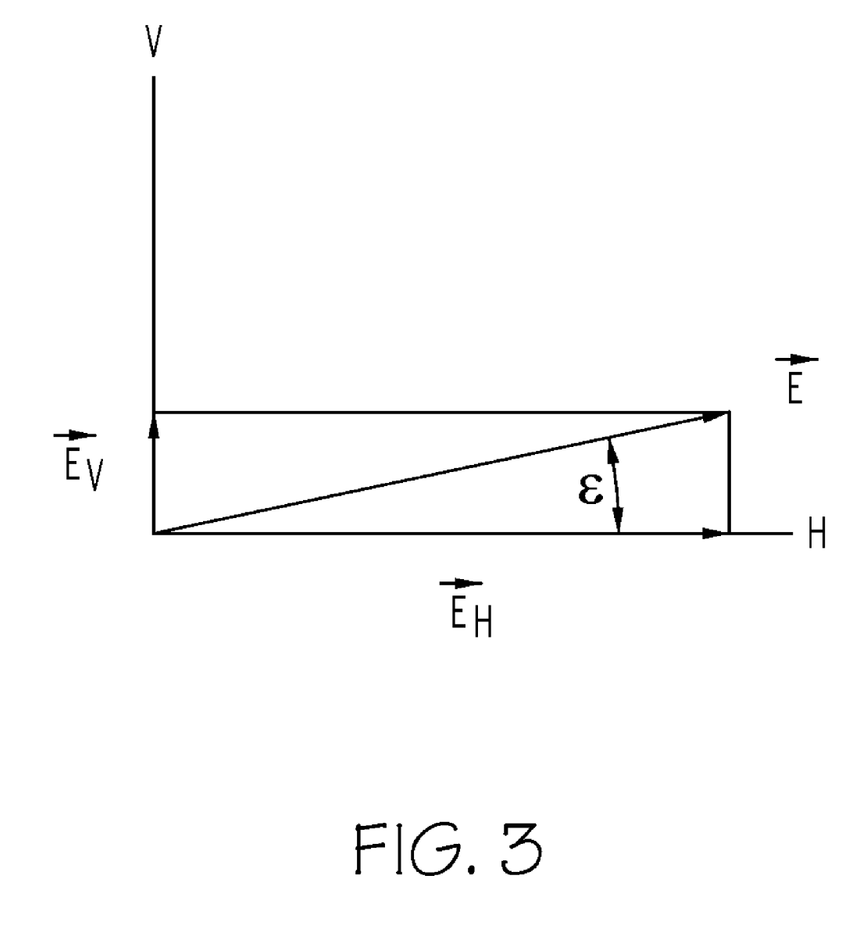
FIG. 3 is a graph illustrating the extinction ratio of a misaligned stitch.

As light travels from the polarized proton-exchanged region of the waveguide to the non-polarized Titanium-diffused region of the waveguide, the light will remain substantially linearly polarized because the Titanium-diffused region has birefringent properties. That is, light that enters in one axis of the Titanium-diffused LiNbO$_3$ will stay substantially contained within that axis. The proton-exchanged LiNbO$_3$ region will polarize the light along a crystalline plane while the Titanium-diffused LiNbO$_3$ region will carry the light along the same crystalline plane. Additionally, when well polarized light propagates along a crystal axis in the proton-exchanged waveguide, and reaches a Titanium-diffused waveguide that has been stitched in, the light will remain polarized along the same plane in the Titanium diffused region, with no introduction of polarization misalignment to the degree that the planes between the two regions themselves are aligned. One of ordinary skill in the art upon reading this specification would appreciate that there will be some small scatter into the axis orthogonal to the preferred polarization access. This scatter will be eliminated when the light moves again into a proton exchanged waveguide Such alignment is achievable by one of ordinary skill in the art who reads this specification. The angular alignment between fast and slow axes of proton-exchanged to Titanium-diffused LiNbO$_3$ waveguides may be accomplished using known processes for diffusing Ti and protons along crystal planes which develop the birefringence in the LiNbO$_3$ crystal. This alignment will maintain throughout the LiNbO$_3$ waveguides the very high extinction ratio provided by the proton exchange waveguide regions. In anisotropic substances such as a birefringent crystal, electric vectors oscillate normal to the propagation vector in orthogonal planes (H and V). The azimuths and refractive indices of H and V are determined by the stoichiometric arrangement of the molecules comprising the crystal. The refractive index is proportional to the area density of atoms in the respective H and V planes (viz., atoms/mm$^2$); the birefringence is proportional to the difference of the refractive indices along the planes. FIG. 3 illustrates the extinction ratio of a misaligned stitch. The extinction ratio obtained at a stitch is determined by angular misalignment ϵ of the field oscillations with respect to the axes in the crystal and is the ratio of the intensities in the H- and V-axes as follows:

$$\frac{I_V}{I_H} = \left[\frac{E_V}{E_H}\right]^2 = \tan^2[\varepsilon] \approx \varepsilon^2,$$

for small ϵ. Referring to FIG. 3 and the equation above, $\vec{E}$ is the propagating field, $E_{V,H}$ are propagating electric fields resolved to Horizontal and Vertical directions and $I_{H,V}$ are intensities measured along the H and V axes. The intensities are proportional to the fields squared. The extinction ratio of the light is the ratio of the intensities due to the misalignment ϵ of the waveguides, and $\epsilon^2 \ll 1$. The extinction ratio is commonly expressed in decibels (dB) as 10·log [$\epsilon^2$].

In one embodiment, stitching of proton-exchanged to Titanium diffused waveguides occurs in regions where the waveguides are parallel, or very nearly parallel, to the crystal planes of the LiNbO$_3$. The LiNbO$_3$ crystal planes will determine the alignment of both birefringent axes in Titanium-diffused waveguide regions, as well as the pass axis of the light in proton-exchanged waveguide regions. The pass axis is an axis in the proton-exchanged waveguide regions that is not severely attenuated. The benefit of being able to make the angular alignment at a stitch nearly perfect avoids gyro rate errors attributable to angular misalignments within the waveguides of the gyroscope. Thus, the extinction ratio of the stitched Titanium-diffused and proton-exchange waveguides regions will be substantially the same as that of an interferometer that utilizes entirely proton-exchanged waveguides.

Figure 7A:
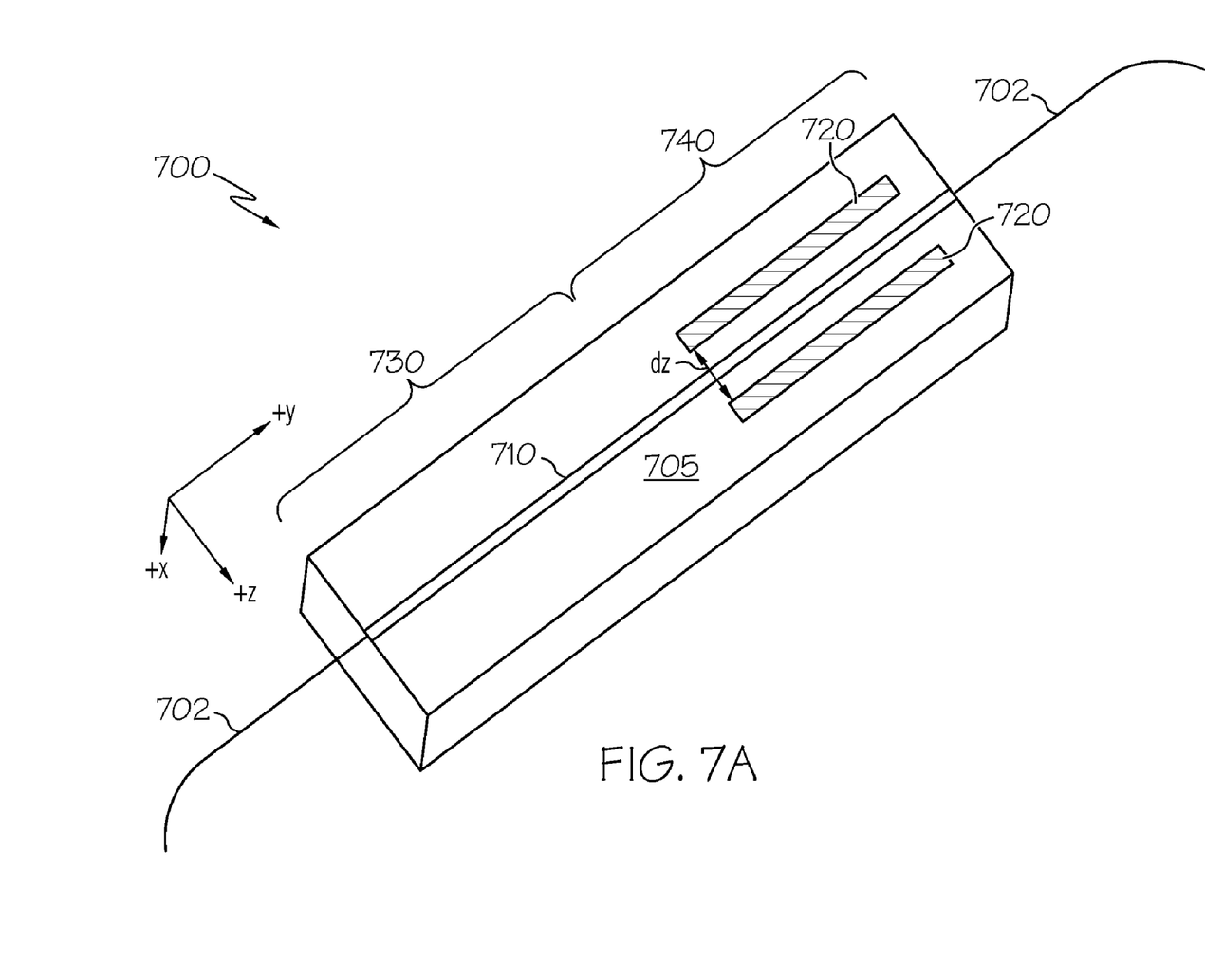
FIG. 7A illustrates a portion of a fiber optic gyro integrated optical circuit (IOC) of one embodiment of the present invention.
Figure 7B:
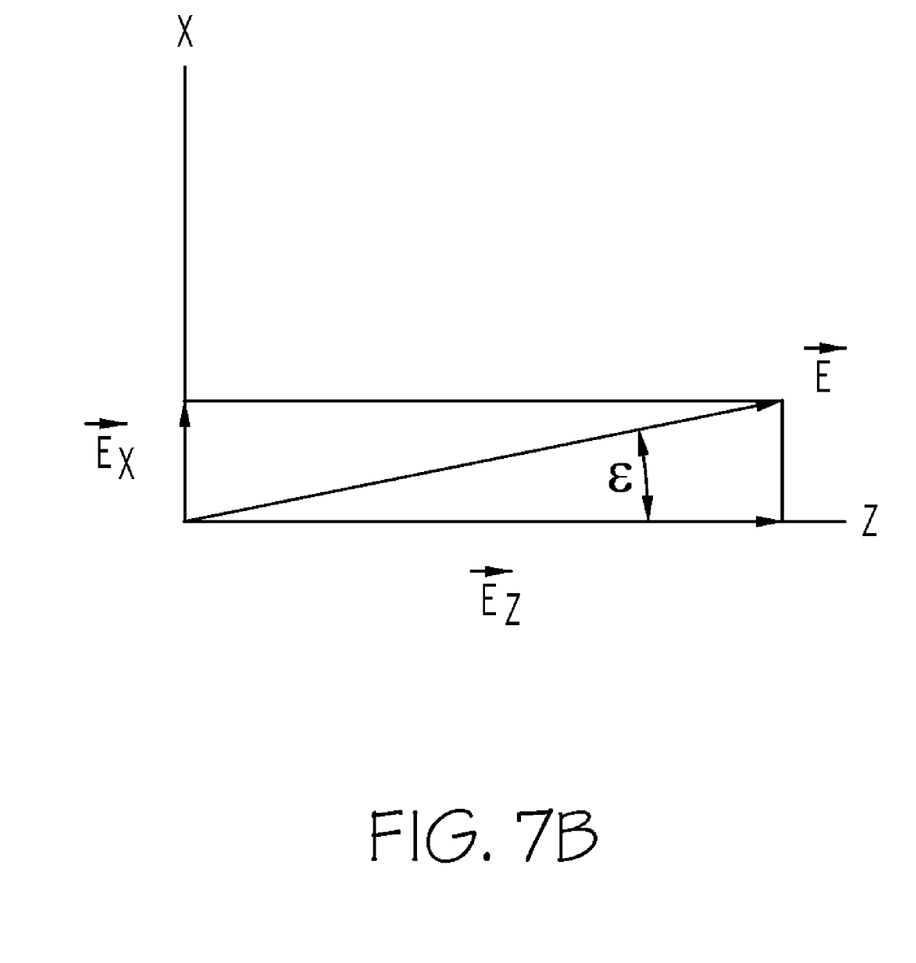
FIG. 7B is a graph illustrating the extinction ratio for FIG. 7A.

FIG. 7A illustrates a portion of a fiber optic gyro IOC 700 of one embodiment of the present invention having a proton exchanged waveguide region 730 stitched to a Ti diffused waveguide region 740. In one embodiment, fiber pigtails 702 are coupled to a waveguide 710 diffused a few microns below the surface of a lithium niobate crystal 705. The fiber pigtails 702 are attached to the waveguide 710 in the xz plane (x cut crystal) and light propagates along the waveguide parallel the y axis (y propagating). The modulator electrodes 720 are shown with spacing dz between the electrodes 720. In a proton exchanged waveguide region 730 of IOC 700, only light polarized along the z axis propagates in the waveguide 710; the component of input light along the x axis is unguided and simply radiates from the point of input and eventually leaves the crystal. In a Ti diffused waveguide region 740 of IOC 700, light in both the x and z axes is guided. FIG. 7B illustrates the extinction ratio of a misaligned stitch between proton exchanged waveguide region 730 and Ti diffused waveguide region 740. With respect to the orientation of the IOC and crystal axes of FIG. 7A, the extinction ratio obtained at the stitch is the ratio of the intensities in the x- and z-axes as follows:

$$\frac{I_x}{I_z} = \left[\frac{E_x}{E_z}\right]^2 = \tan^2[\varepsilon] \approx \varepsilon^2$$

Figure 4:
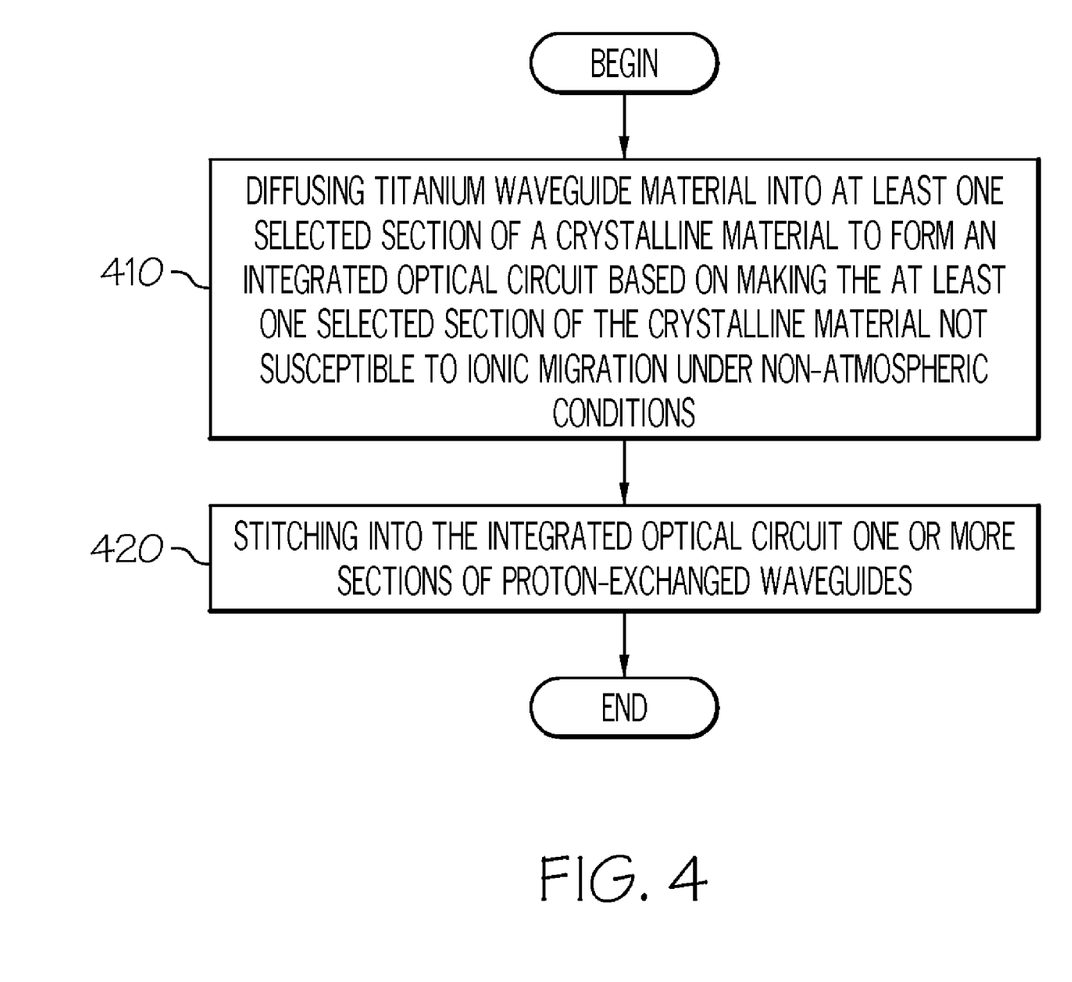
FIG. 4 is a flow chart illustrating a process for mitigating ionic migration in a fiber-optic gyroscope.

FIG. 4 is a flow chart illustrating a method for mitigating ionic migration in a waveguide. The method begins at 410 with diffusing titanium waveguide material into at least one selected section of a crystalline material to form an integrated optical circuit based on making the at least one selected section of the crystalline material not susceptible to ionic migration under non-atmospheric conditions. The method proceeds to 420 with stitching into the integrated optical circuit one or more sections of proton-exchanged waveguides.

Figure 5:
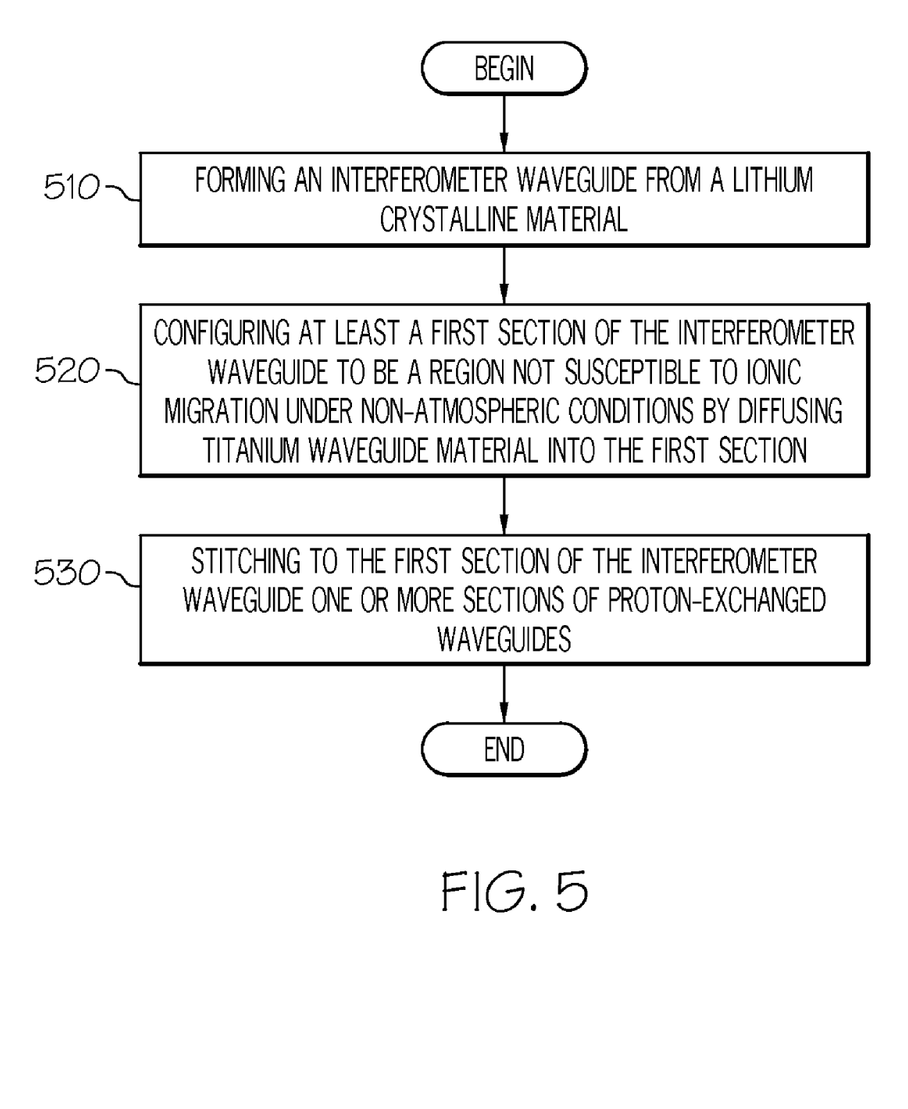
FIG. 5 is a flow chart illustrating a process for mitigating ionic migration in a fiber-optic gyroscope.

FIG. 5 is a flow chart illustrating a method for producing an integrated optical circuit for an interferometer that is not susceptible to ionic migration under non-atmospheric conditions. The method begins at 510 with forming a waveguide from a Lithium crystalline material. The method proceeds to 520 with configuring at least a first section of the waveguide to be a region not susceptible to ionic migration under non-atmospheric conditions by diffusing titanium waveguide material into the first section. The method proceeds to 530 with stitching to the first section of the waveguide one or more sections of proton-exchanged waveguides.

Figure 6A:
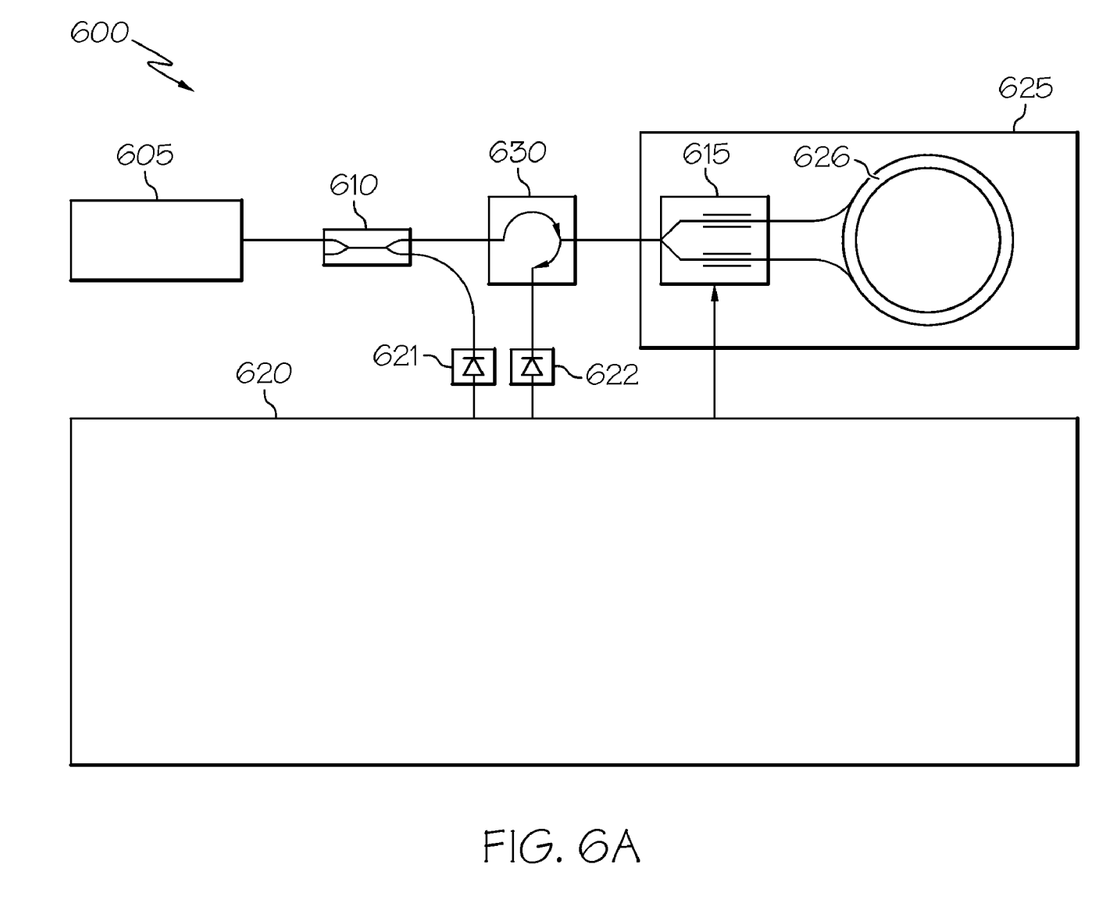
FIGS. 6A and 6B illustrate an interferometer fiber optic gyroscope of one embodiment of the present invention.
Figure 6B:
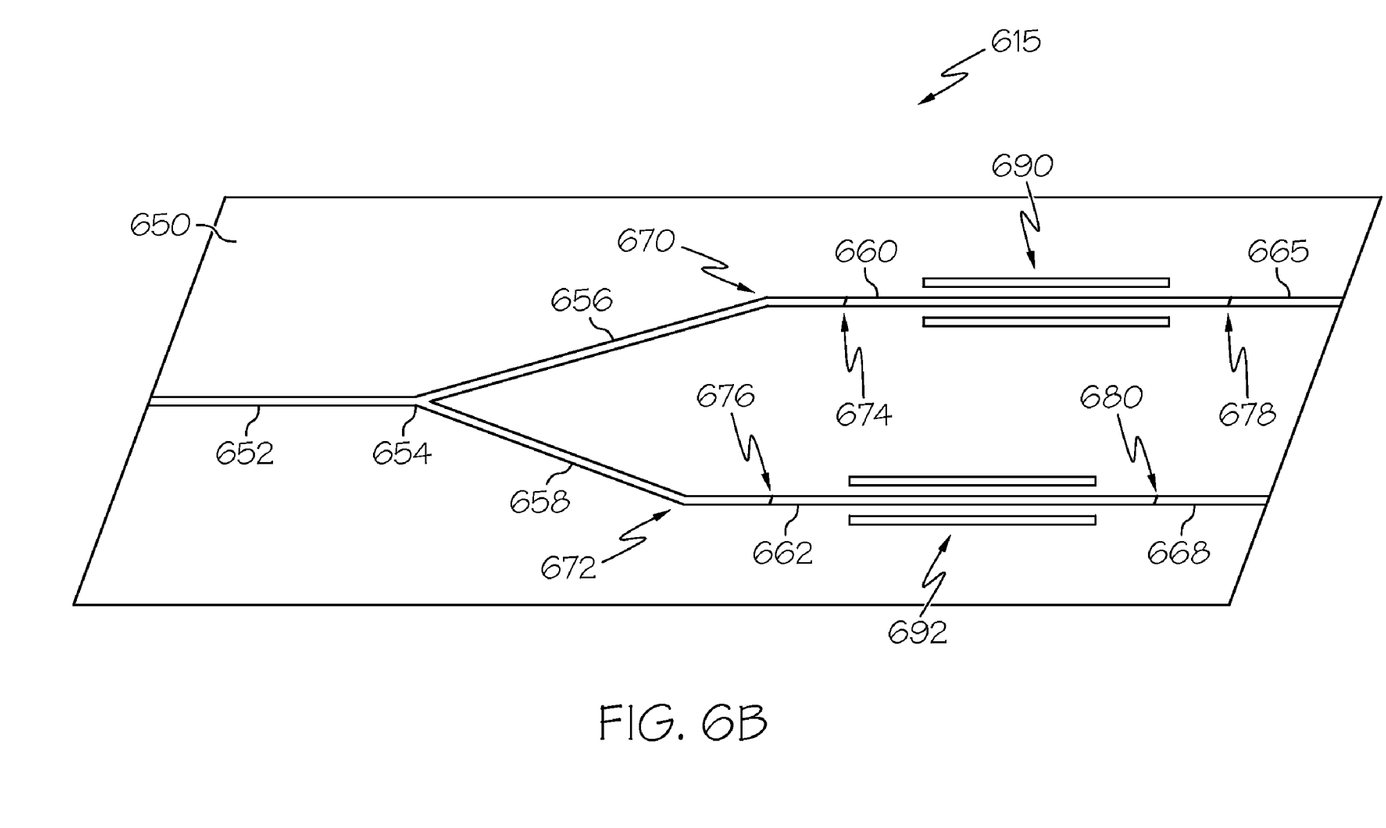

FIGS. 6A and 6B illustrate an example of an interferometric fiber optic gyroscope system 600 of one embodiment of the present invention. Fiber optic gyroscope system 600 comprises a light source 605, a sensing-loop assembly 625 and a detector assembly 620. Detector assembly 620 comprises the modulation/demodulation electronics for the gyroscope with which phase modulation is created and the resulting signal is demodulated into rate. Detector assembly 620 includes photodiodes 621 and 622 which perform the optical detection. Sensing-loop assembly 625 comprises a fiber coil 626 coupled to a crystalline LiNbO₃ integrated optical circuit 615. Integrated optical circuit 615 includes LiNbO₃ waveguides designed to create a y-junction wherein the two ends of a fiber coil 626 are attached.

In one embodiment, an optical coupler 610 redirects a portion of the light from light source 605 to detector 620. The remainder of the beam may be supplied to integrated optical circuit 615 via a circulator element 630 that is, in turn, coupled to the detector 620. In one embodiment, sensing-loop assembly 625 comprises at Sagnac gyroscope. In other embodiments, one or more of optical coupler 610, and circulator element 630 also comprise crystalline LiNbO₃ waveguides.

In operation, in one embodiment, a light beam from light source 605 is provided to integrated optical circuit 615. The light from light source 605 enters a first proton-exchanged waveguide portion 652 of integrated optical circuit 615, which filters the light beam into a beam of light linearly polarized along the axis provided by the waveguides crystalline structure. This polarized light beam enters a y-junction 654 where it is split into the two beams that will enter the reciprocal paths provided by fiber coil 626. Before entering fiber coil 626, the two beams are each modulated using a waveform that aids in detecting phase shifts in the interference pattern produced when the two beams are recombined. This modulation is achieved by a set of first modulators 690 and second modulators 692, which comprise electrodes respectively across waveguide portions 660, 662. Because modulators 690 and 692 modulate the light beam by producing electric fields around waveguide portions 660, 662, these waveguide portions would be susceptible to ion-migration under non-atmospheric conditions if proton-exchange waveguides were used. Accordingly, instead of using proton-exchange waveguides, Titanium-diffused waveguides are selected for these regions based on making these regions of the waveguide not susceptible to ionic migration under in non-atmospheric conditions. The two beams exiting from fiber coil 626 are recombined in IOC 615, producing a interferogram that indicates the rotational velocity of the gyroscope. The combine beam is provided to detector assembly 620 via photodiode 622 which deciphers these rates from the returning beam.

As shown in FIG. 6B, connected segments of Ti-diffused and proton-exchanged waveguides are stitched on the same substrate 650. The first and second branch sections 656 and 658 include respective bent regions 670 and 672. The bent regions 670 and 672 may have an angular "elbow" configuration as illustrated in FIG. 3, or may be configured with a less-severe, more rounded radius of curvature than that illustrated. Titanium-diffused waveguide portions 660 and 662 are respectively coupled to the first and second branch sections 656 and 658. First and second modulators 690 and 692 are positioned within substrate 650 parallel to the respective waveguide portions 660 and 662. Modulators 690 and 692 provide respective modulating voltages generating respective electric fields that alter the refractive index of the LiNbO₃ to phase modulate the light beams. In one embodiment, IOC 615 further includes second and third proton-exchanged waveguide portions 665 and 668 coupled to the respective waveguide portions 660 and 662. The waveguide portions 660 and 662 are stitched, or otherwise coupled, to the first and second branch sections 656 and 658 at respective locations 674 and 676. In one embodiment, these locations are selected because electric fields produced by the modulators 690 and 692 are substantially zero. These locations would not be susceptible to ionic migration due to modulators 690 and 692. Additionally, the second and third proton-exchanged waveguide portions 665 and 668 are stitched to the waveguide portions 660 and 662 at respective locations 678 and 680 where the electric fields produced by the modulators 690 and 692 are substantially zero. As such, stitching of proton-exchanged to Titanium-diffused waveguides occurs far enough from the modulators 690 and 692 such that the proton-exchanged waveguides regions 656, 658, 665 and 668 are unaffected by ion migration due to electric fields associated with modulation voltages.

As discussed above, alignment of proton-exchanged to Titanium-diffused waveguides is aided when stitching of these regions occurs in regions of the substrate 650 where the crystal planes of the LiNbO₃ are parallel to the direction of the waveguides. This serves to preserve the polarization provided by the proton-exchanged regions and avoids introduction of related errors in the rotational rate determination due to corruption of the interferogram. As such, in one embodiment, the stitching is located a distance away from the bent regions (such as at 670 and 672) sufficient to avoid modal transition effects that may occur at the bent regions in addition to being located where expected electric fields are negligible. In one embodiment, the respective stitching locations 674 and 676 are approximately halfway between the modulators 690 and 692 and the bent regions 670 and 672.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for mitigating ionic migration in a waveguide, the method comprising:
   selecting a Titanium-diffused waveguide material for forming a first section of a waveguide to propagate light within an interferometer based on a criteria of making the first section of the waveguide not susceptible to ionic migration under non-atmospheric conditions;
   selecting a proton-exchanged waveguide material to propagate light within the interferometer for a second section of the waveguide that does not include the first section of the waveguide; and
   producing an integrated optical circuit for the interferometer comprising the first section of the waveguide and the second section of the waveguide, wherein stitching the first section of the waveguide to the second section of the waveguide further comprises aligning a crystalline structure of the first section of the waveguide with a crystalline structure of the second section of the waveguide so that the interferometer possesses an extinction ratio equivalent to the extinction ratio of the second section of the waveguide.

2. The method of claim 1, wherein the first section of the waveguide includes a modulator that generates an electric field for changing a refractive index for the first section of the waveguide.

3. The method of claim 1, further comprising:
   applying a stitching process to couple the first section of the waveguide to the second section of the waveguide at a location within the interferometer that is not susceptible to ionic migration from an electric field.

4. The method of claim 1, further comprising:
   forming at least one branch of a y-junction waveguide that includes the first section of the waveguide.

5. The method of claim 1, further comprising
   stitching the first section of the waveguide to the second section of the waveguide in a manner that preserves linear polarization of light within the interferometer.

6. A method for producing an integrated optical circuit for an interferometer that is not susceptible to ionic migration under non-atmospheric conditions, the method comprising:
   forming an interferometer waveguide from a Lithium crystalline material;
   configuring at least a first section of the interferometer waveguide to be a region not susceptible to ionic migration under non-atmospheric conditions by diffusing titanium waveguide material into the first section; and
   stitching to the first section of the interferometer waveguide one or more sections of proton-exchanged waveguides, wherein applying the stitching process further comprises aligning a crystalline structure of the first section of the waveguide with a crystalline structure of the proton-exchanged waveguide region so that the interferometer possesses an extinction ratio equivalent to the extinction ratio of the proton-exchanged waveguide region.

7. The method of claim 6, further comprising:
   configuring at least a second section of the interferometer waveguide to be a region not susceptible to ionic migration under non-atmospheric conditions by diffusing titanium waveguide material into the second section; and
   stitching to the second section of the waveguide the one or more sections of proton-exchanged waveguides.

8. The method of claim 6, further comprising:
   forming at least part of a first branch of a y-junction waveguide from the first section of the interferometer waveguide; and
   forming at least part of a second branch of the y-junction waveguide from the second section of the interferometer waveguide.

9. The method of claim 6, further comprising:
   locating at least one modulator within the integrated optical circuit at a location that does not induce ion-migration within a proton-exchanged waveguide region.

10. The method of claim 6, further comprising:
    applying a stitching process to couple the first section of the interferometer waveguide to a proton-exchanged waveguide region a location within the interferometer that is not susceptible to ionic migration from an electric field.

11. An integrated optical circuit for an interferometer subject to non-atmospheric conditions, the integrated optical circuit comprising:
    a first section of waveguide within a Lithium crystalline structure that is exposed to an electrical field, the first section of waveguide being a Titanium-diffused waveguide region;
    a second section of waveguide within the Lithium crystalline structure that is not within the first section of the waveguide, the second section of waveguide being a proton-exchange waveguide region;
    a stitch coupling the first section of waveguide to the second section of waveguide; and
    a third section of waveguide configured to combine reciprocal light beams to produce an interference pattern, wherein at least one of the reciprocal light beams passes through the first section of waveguide and the second section of waveguide prior to producing the interference pattern, wherein the stitch is formed to align a crystalline structure of the first section of waveguide with a crystalline structure of the second section of waveguide so that the first section of waveguide and the second section of waveguide together possess an extinction ratio equivalent to the extinction ratio of the second section of waveguide.

12. The integrated optical circuit of claim 11, the stitch providing an alignment of crystalline structures that preserves a polarization of a light beam traversing from the second section of waveguide to the first section of waveguide.

13. The integrated optical circuit of claim 11, the stitch located in a region not susceptible to ionic migration from an electric field under non-atmospheric conditions.

14. The integrated optical circuit of claim 11, further comprising:
    at least one modulator having electrodes parallel to the first section of waveguide, the modulator producing a phase modulation pattern in a light beam travelling through the first section of waveguide.

15. The integrated optical circuit of claim 11, the stitch located at a distance from the modulator where electric fields produced by the electrodes in negligible.

16. The integrated circuit of claim 11, wherein the second section of waveguide forms a y-junction.

17. The integrated circuit of claim 11, the second section of waveguide comprising at least one bend, wherein the stitch is located at a distance from the bend that avoids modal transition effects.

* * * * *